United States Patent
Zhao et al.

(10) Patent No.: US 8,125,117 B2
(45) Date of Patent: Feb. 28, 2012

(54) ELECTRIC MOTOR AND ROTOR THEREFOR

(75) Inventors: Jian Zhao, Shenzhen (CN); Yong Li, Shenzhen (CN); Chang Lin Jin, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 66 days.

(21) Appl. No.: 12/506,527

(22) Filed: Jul. 21, 2009

(65) Prior Publication Data

US 2010/0013361 A1 Jan. 21, 2010

(30) Foreign Application Priority Data

Jul. 21, 2008 (CN) .......................... 2008 1 0068577

(51) Int. Cl.
*H01R 39/04* (2006.01)
*H02K 19/00* (2006.01)
(52) U.S. Cl. .................. 310/233; 310/314; 310/198
(58) Field of Classification Search .................. 310/233, 310/234, 198, 184–197
See application file for complete search history.

(56) References Cited

U.S. PATENT DOCUMENTS

| | | | | | |
|---|---|---|---|---|---|
| 4,270,065 | A | * | 5/1981 | Major | 310/207 |
| 4,876,472 | A | * | 10/1989 | Shiraki et al. | 310/198 |
| 2004/0021394 | A1 | * | 2/2004 | Maeda et al. | 310/233 |
| 2006/0220489 | A1 | * | 10/2006 | Osawa et al. | 310/198 |

* cited by examiner

*Primary Examiner* — Quyen Leung
*Assistant Examiner* — Leda Pham
(74) *Attorney, Agent, or Firm* — Muncy, Geissler, Olds & Lowe, PLLC

(57) ABSTRACT

An electric motor includes: a rotor; a stator; and brush gear. The rotor has a shaft, a rotor core and a commutator fitted to the shaft. The rotor core has 5n teeth, n being a positive integer. Two coils are wound on each tooth with each coil being wound about a single tooth and having two ends. The commutator has 10n bars forming a brush contact surface. The stator includes a yoke and a plurality of permanent magnets installed at an inner surface of the yoke and facing the rotor core. The ends of the two coils wound on each tooth are respectively connected to two pairs of adjacent bars and the center line between one pair of the two pairs of adjacent bars and the center line between the other pair of the two pairs of adjacent bars are diametrically opposed.

9 Claims, 3 Drawing Sheets

US 8,125,117 B2

ELECTRIC MOTOR AND ROTOR THEREFOR

CROSS REFERENCE TO RELATED APPLICATIONS

This non-provisional patent application claims priority under 35 U.S.C. §119(a) from Patent Application No. 200810068577.0 filed in The People's Republic of China on Jul. 21, 2008.

FIELD OF THE INVENTION

This invention relates to an electric motor and in particular, to a rotor for a PMDC motor.

BACKGROUND OF THE INVENTION

Generally, the number of commutator bars (referred to as bar number), the number of rotor poles or slots (referred to a slot number) and the number of winding coils of a permanent magnet DC motor are the same. A standard commutator only sustains roughly stable commutation voltage. Even so, commutation sparks are visably generated between adjacent commutator bars as the brush pass over them. To improve commutation, sometimes the commutator bar number, the number of winding coils is twice the rotor slot number. A known micromotor adopts four poles (stator poles) and five slots, because it has the advantages of simple structure, good ventilation, less copper, etc.

A known winding arrangement for a micromotor with four poles and five slots is shown in FIG. 5. This mode has an upper winding 71 and a lower winding 72 which are successively connected with adjacent commutator bars 1-10. That is: the upper winding coil 71 and the lower winding coil 72 are wound on each tooth A-E, and each coil has two ends. For example, on tooth A, the upper winding coil 71 is connected to commutator bars 1 and 2, and the lower winding coil 72 is connected to the commutator bars 2 and 3. On tooth B, the upper winding coil 71 is connected to the commutator bars 3 and 4 while the lower winding coil 72 is connected to the commutator bars 4 and 5, and so on.

However, because the two windings are seperately connected with adjacent commutator bars in the traditional winding arrangement, when one winding is located in the best commutation position, the other winding would be ahead or behind the best position by a mechanical angle of 36 degrees, so the commutation sparks will be greater.

Another traditional winding arrangement is shown in FIG. 6. A single winding is wound in each tooth A-E, two ends of each winding are seperately connected to a pair of corresponding commutator bars 1-10. After a winding is completely wound, the next winding is reached through connecting lines known as equalizers 61-65. Five windings form a complete circuit. The current of each winding is twice the winding current of the arrangement shown in FIG. 5. Therefore, the diameter of the wire of the winding of FIG. 6 is usually twice the diameter of the wire of the winding of FIG. 5. In the winding arrangement shown in FIG. 6, the motion of the winding machine is complex and requires winding of the winding coils and winding of the equalizers. Moreover, because the equalizer lines 61-65 are required to pass full armature current, they are required to be as thick as the winding coil, and because the equalizer lines are directly connected from one commutator bar hook to another commutator bar hook they are accumulated on the neck of the commutator between the bars and the rotor core and are not beneficial to heat dissipation.

Hence there is a desire for a rotor for a DC motor which has two coils wound about each tooth of the rotor and which has improved commutation.

SUMMARY OF THE INVENTION

Accordingly, in one aspect thereof, the present invention provides a rotor for a PMDC motor, comprising: a shaft; a rotor core mounted on the shaft, and a commutator fitted to the shaft adjacent the rotor core, the rotor core having 5n teeth, n being a positive integer, two coils wound on each tooth, each coil being wound about a single tooth and having a pair of ends, the commutator having 10n bars forming a brush contact surface, wherein the ends of the two coils wound on each tooth are respectively connected to two pairs of adjacent bars, and the center line between a first pair of the two pairs of adjacent bars and the center line between the other pair of adjacent bars are diametrically opposite to each other.

Preferably, the ends of one of the two coils wound on the same tooth is respectively connected to a pair of adjacent bars, and the ends of the other one of the two coils is respectively connected to the other pair of adjacent bars.

Alternatively, one of the ends of each of the two coils wound on the same tooth is respectively connected to one pair of the two pairs of adjacent bars, the other ends being respectively connected to the other pair of the two pairs of adjacent bars.

Preferably, the rotor is a rotor of a micro-motor with 4 poles, 5 slots and 10 bars.

According to a second aspect thereof, the present invention provides a motor comprising: a rotor; a stator; and brush gear; the rotor comprising a shaft, a rotor core and a commutator fitted to the shaft, the rotor core having 5n teeth, n being a positive integer, two coils being wound in each tooth, each coil being wound about a single tooth and having two ends, the commutator having 10n bars forming a brush contact surface, the stator comprising a yoke, a plurality of permanent magnets installed at an inner surface of the yoke and facing the rotor core, and the brush gear comprising a plurality of carbon brushes arranged to make sliding contact with the brush contact surface of the commutator, wherein the ends of the two coils wound in each tooth are respectively connected to two pairs of adjacent bars, and the center line between one pair of the two pairs of adjacent bars and the center line between the other pair of the two pairs of adjacent bars are diametrically opposite to each other.

Preferably, the ends of one of the two coils wound on the same tooth is respectively connected to a first pair of the two pairs of adjacent bars, and the ends of the other one of the two coils are respectively connected to the other pair of adjacent bars.

Alternatively, one of the ends of each of the coils wound on the same tooth is respectively connected to one pair of the two pairs of adjacent bars, the other ends being respectively connected to the other pair of the two pairs of adjacent bars.

Preferably, the motor is a micro-motor with 4 poles, 5 slots and 10 bars.

BRIEF DESCRIPTION OF THE DRAWINGS

A preferred embodiment of the invention will now be described, by way of example only, with reference to figures of the accompanying drawings. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
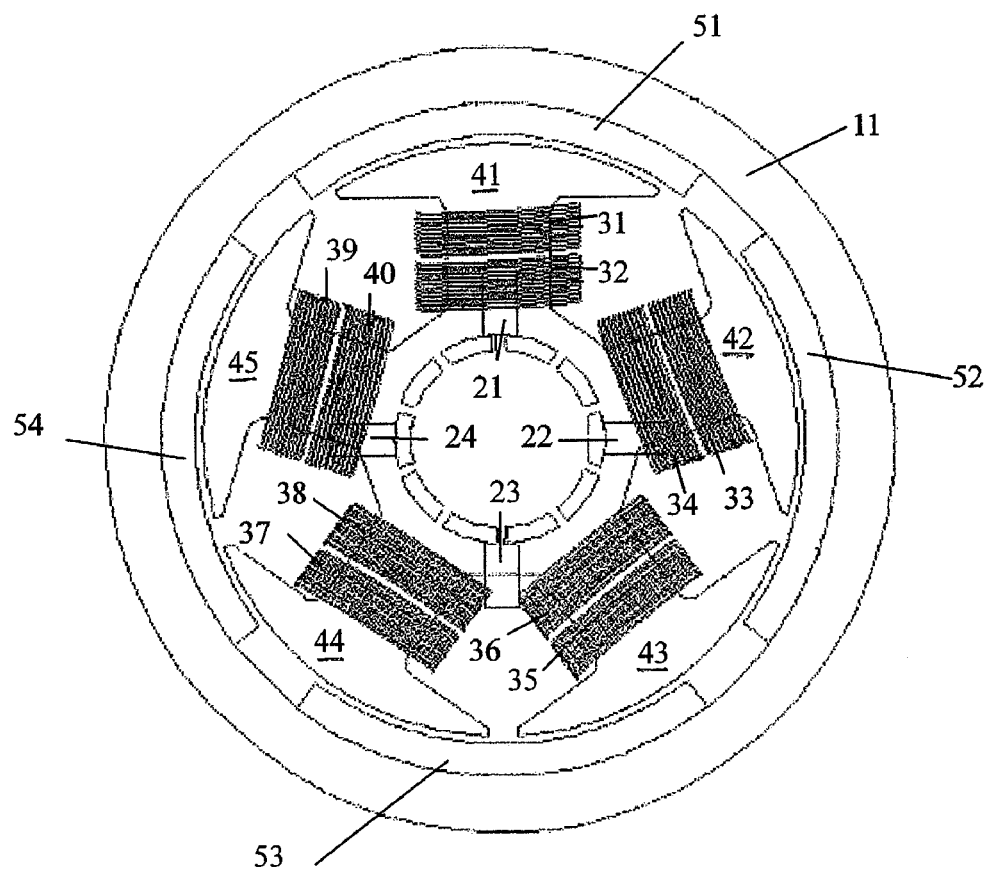
FIG. 1 is a schematic diagram of an axial end view of a motor according to a first embodiment of the present invention.

FIG. 1 illustrates a PMDC motor (permanent magnet direct current motor) according to a first, preferred embodiment of the present invention. The motor has a stator, brush gear and a rotor. The stator comprises a housing or yoke 11, and four permanent magnets 51-54 fitted to an inner surface of the yoke. The brush gear has four brushes 21-24 arranged to make sliding contact with a brush contact surface of the commutator for transferring electrical power to the rotor.

Figure 2:
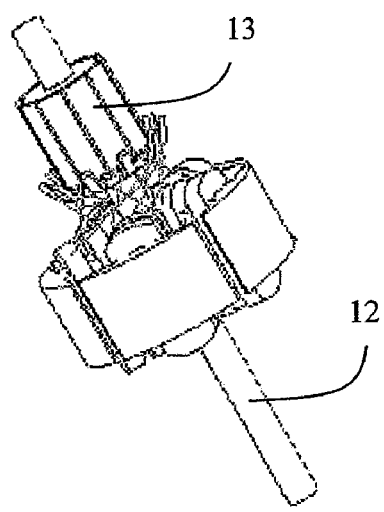
FIG. 2 is an isometric view of a rotor being a part of the motor of FIG. 1.

FIG. 2 illustrates the rotor of FIG. 1. The rotor comprises a shaft 12, a rotor core mounted on the shaft 12, and a commutator 13 fitted to the shaft 12 next to the rotor core. The rotor core comprises five teeth 41-45 extending towards and facing the permanent magnets 51-54 across a small air gap. The commutator 13 has ten bars 1-10 arranged to form the brush contact surface. Each tooth 41-45 is wound with two windings 31-40 and the windings are terminated or otherwise electrically connected to termination hooks of the commutator bars.

Figure 3:
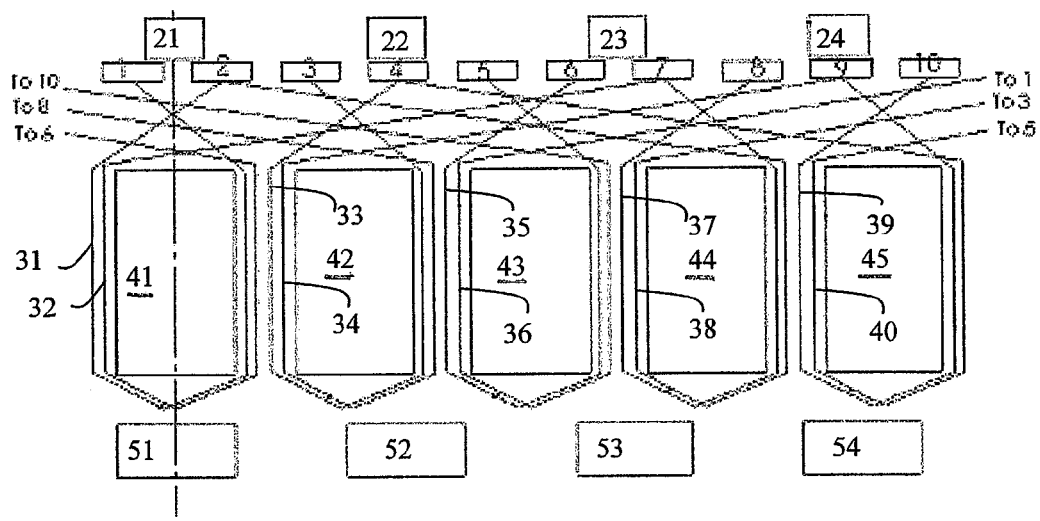
FIG. 3 is a schematic winding diagram of a motor according to a first embodiment of the present invention.

As shown in the winding diagram of FIG. 3, the right end of winding 31 is connected to commutator bar 1 and the left end is connected to bar 2. Also the right end of winding 38 is connected to bar 2 and the left end is connected to bar 3. To simplify the description, the above description is used as an example to explain the following. Assuming that the winding process starts by connecting the wire to bar 1, the wire is then wound about tooth 41 to form coil 31, then connected to bar 2, wound about tooth 44 to form coil 38, then connected to bar 3, then wound about tooth 42 to form coil 33, connected to bar 4, wound about tooth 45 to form coil 40, connected to bar 5, wound about tooth 43 to form coil 35, connected to bar 6, and so on until coil 36 is wound about tooth 43 and then connected to bar 1 to complete the winding. In this way, the sequence of forming the coils is 31-38-33-40-35-32-37-34-39-36, and the corresponding sequence of connecting to the bars is 1-2-3-4-5-6-7-8-9-10. Thus, the coil 31 is connected to bars 1 and 2. The coil 38 is connected to bars 2 and 3. The coil 33 is connected to bars 3 and 4. The coil 40 is connected to bars 4 and 5. The coil 35 is connected to bars 5 and 6. The coil 32 is connected to bars 6 and 7. The coil 37 is connected to bars 7 and 8. The coil 34 is connected to bars 8 and 9. The coil 39 is connected to bars 9 and 10. The coil 36 is connected to bars 10 and 1.

Of course, winding can start from any bar but it is convenient to name the bar from which the winding progess starts as bar 1.

The motor works in the following manner. When bars 1 and 2 are rotated to the position of carbon brush 21, bars 6 and 7 are rotated to the position of carbon brush 23. Coil 31 and coil 32 are shorted out separately by the brushes. The carbon brush 21 and the carbon brush 23 are located in the same magnetic pole. So coil 31 and coil 32 are located in the same commutation position. When bars 3 and 4 are rotated to the position of carbon brush 21, bars 8 and 9 are rotated to the position of carbon brush 23. The coil 32 and the coil 34 are commutated, and so on. In this way, the upper and the lower windings wound on the same tooth have the same commutation position, which can improve commutation as evidenced by reduced commutation sparks.

Figure 4:
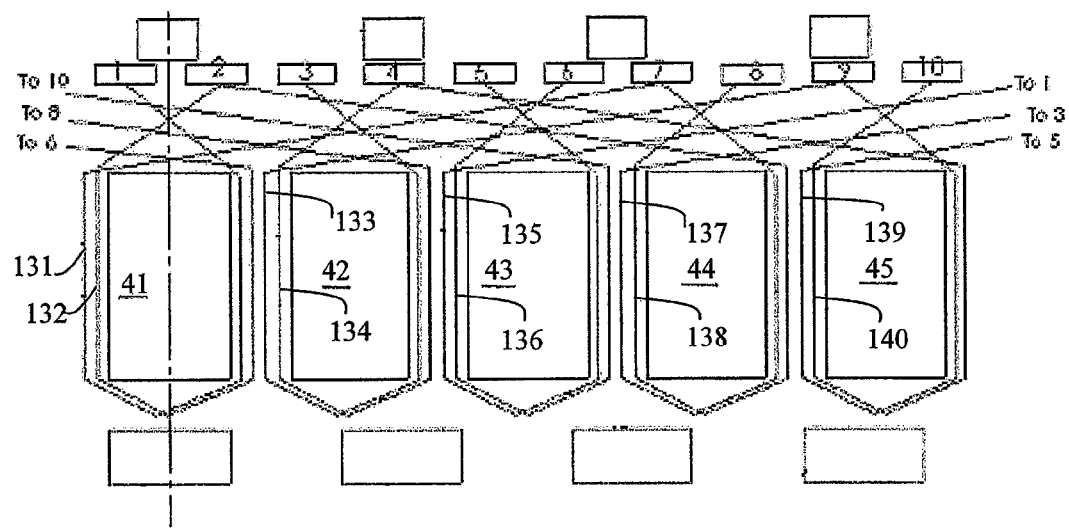
FIG. 4 is a schematic winding diagram of a motor according to a second embodiment of the present invention.
Figure 5:
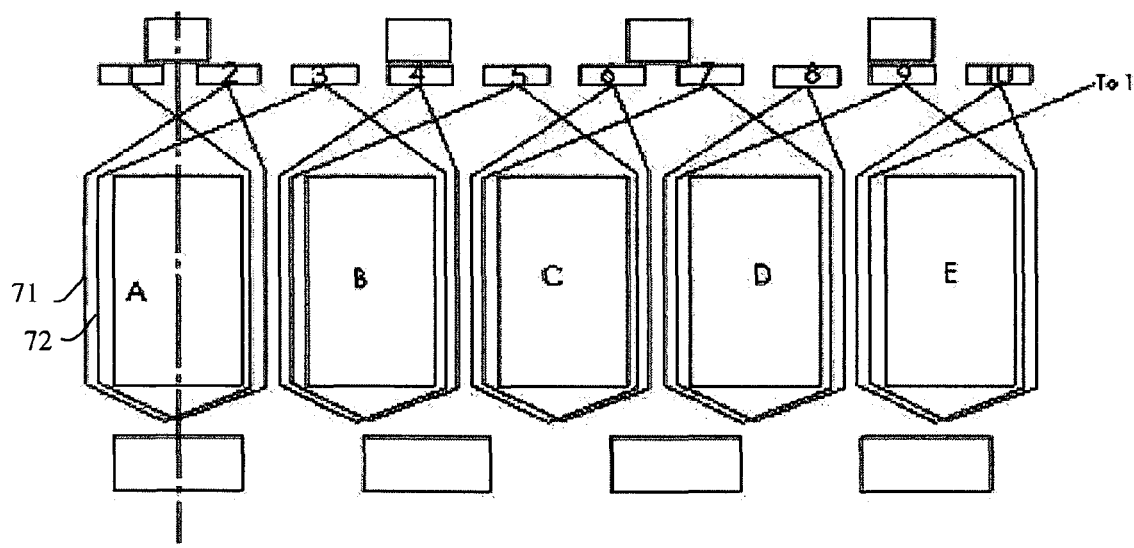
FIG. 5 is a schematic winding diagram of a motor according to a prior art.
Figure 6:
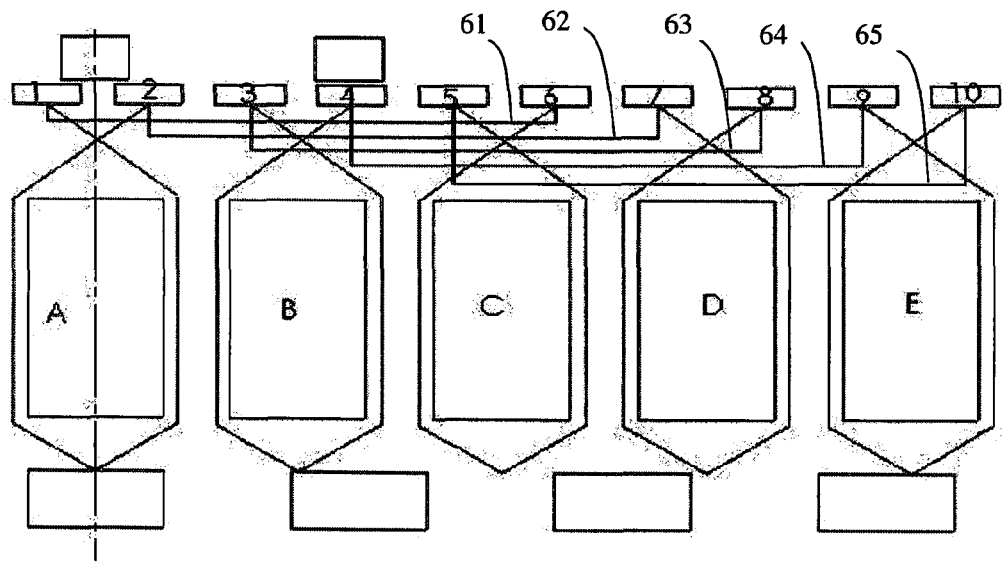
FIG. 6 is a schematic winding diagram of a motor according to another prior art example.

The rotor may be wound according to a different winding sequence embodiment of the present invention as shown in FIG. 4.

As shown in FIG. 4, coil 131 is connected to bars 1 and 7. Coil 132 is connected to bars 2 and 6. Coil 133 is connected to bars 3 and 9. Coil 134 is connected to bars 4 and 8. Coil 135 is connected to bars 5 and 1. Coil 136 is connected to bars 6 and 10. Coil 137 is connected to bars 7 and 3. Coil 138 is connected to bars 8 and 2. Coil 139 is connected to bars 9 and 5. Coil 140 is connected to bars 10 and 4. When bars 1 and 2 are rotated to the position of carbon brush 21, bars 6 and 7 are rotated to the position of carbon brush 23. Coil 131 and coil 132 are located in the same commutation position. When bars 3 and 4 are rotated to the position of carbon brush 21, bars 8 and 9 are rotated to the position of carbon brush 23. Coil 133 and coil 134 are located in the same commutation position, and so on.

In this winding arrangement, the ends of two coils wound on the same tooth are seperately connected to two pairs of adjacent bars. However, the difference of the center line between one pair of the two pairs of adjacent bars and the center line between the other pair of adjacent bars is the mechanical angle of 180 degrees.

It is to be understand that these winding arrangements are suitable for a micromotor with 4n poles and 5n slots, wherein, n is positive integer. The example of n=1 has been chosen as a simple representative example for ease of understanding and description.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A rotor for a PMDC motor, comprising: a shaft; a rotor core mounted on the shaft, and a commutator fitted to the shaft adjacent the rotor core, the rotor core having 5n teeth, n being a positive integer, two coils wound on each tooth, each coil being wound about a single tooth and having a pair of ends, the commutator having 10n bars forming a brush contact surface, wherein the ends of the two coils wound on the same tooth are connected to two pairs of adjacent bars, and a center line between a first pair of the two pairs of adjacent bars and a center line between the other pair of adjacent bars are diametrically opposite to each other, and the ends of each coil are connected to two bars which are spaced apart by an angle not equal to 180°.

2. The rotor of claim 1, wherein the ends of one of the two coils wound on the same tooth is respectively connected to a pair of adjacent bars, and the ends of the other one of the two coils is respectively connected to the other pair of adjacent bars.

3. The rotor of claim 1, wherein one of the ends of each of the two coils wound on the same tooth is respectively connected to one pair of the two pairs of adjacent bars, the other ends being respectively connected to the other pair of the two pairs of adjacent bars.

4. The rotor of claim 1, wherein the rotor is a rotor of a micro-motor with 4 poles, 5 slots and 10 bars.

5. A motor comprising: a rotor a stator; and brush gear; the rotor comprising a shaft, a rotor core and a commutator fitted to the shaft, the rotor core having 5n teeth, n being a positive integer, two coils being wound on each tooth, each coil being wound about a single tooth and having two ends, the commutator having 10n bars forming a brush contact surface, the stator comprising a yoke, a plurality of permanent magnets installed at an inner surface of the yoke and facing the rotor core, and the brush gear comprising a plurality of carbon brushes arranged to make sliding contact with the brush contact surface of the commutator, wherein the ends of the two coils wound on the same tooth are respectively connected to two pairs of adjacent bars, and a center line between one pair of the two pairs of adjacent bars and the center line between the other pair of the two pairs of adjacent bars are diametrically opposite to each other.

6. The motor of claim 5, wherein the ends of one of the two coils wound on the same tooth is respectively connected to a first pair of the two pairs of adjacent bars, and the ends of the other one of the two coils are respectively connected to the other pair of adjacent bars.

7. The motor of claim 5, wherein one of the ends of each of the coils wound on the same tooth is respectively connected to one pair of the two pairs of adjacent bars, the other ends being respectively connected to the other pair of the two pairs of adjacent bars.

8. The motor of claim 5, wherein the motor is a micro-motor with 4 poles, 5 slots and 10 bars.

9. The motor of claim 5, wherein the ends of each coil are connected to two bars which are spaced apart by an angle not equal to 180°.

* * * * *